United States Patent
Weltikol et al.

(10) Patent No.: US 9,738,143 B2
(45) Date of Patent: Aug. 22, 2017

(54) SELF-STORING FOLDING TONNEAU COVER

(71) Applicant: Retrax Holdings, LLC, Grand Forks, ND (US)

(72) Inventors: Brandon Scott Weltikol, Grand Forks, ND (US); Tim Adam, Thompson, ND (US)

(73) Assignee: Retrax Holdings, LLC, Grand Forks, ND (US)

( * ) Notice: Subject to any disclaimer, the term of this patent is extended or adjusted under 35 U.S.C. 154(b) by 0 days.

(21) Appl. No.: 15/007,549

(22) Filed: Jan. 27, 2016

(65) Prior Publication Data

US 2017/0210214 A1    Jul. 27, 2017

(51) Int. Cl.
    *B60J 7/14* (2006.01)
    *B60P 7/02* (2006.01)
    *B60J 7/19* (2006.01)

(52) U.S. Cl.
    CPC .............. *B60J 7/141* (2013.01); *B60J 7/198* (2013.01); *B60P 7/02* (2013.01)

(58) Field of Classification Search
    CPC .... B60J 7/141; B60J 7/10; B60J 7/198; B60P 7/02
    See application file for complete search history.

(56) References Cited

U.S. PATENT DOCUMENTS

| | | | | |
|---|---|---|---|---|
| 4,199,188 A | * | 4/1980 | Albrecht | B60P 3/42 296/100.04 |
| 4,813,735 A | * | 3/1989 | Avitable | B60J 7/041 296/100.02 |
| 6,276,735 B1 | * | 8/2001 | Champion | B60J 7/041 296/100.06 |
| 6,533,343 B2 | * | 3/2003 | Bohm | B60J 7/041 296/100.02 |
| 6,702,359 B2 | * | 3/2004 | Armstrong | B60J 7/08 296/100.02 |
| 8,087,713 B2 | | 1/2012 | Schrader et al. | |
| 8,960,765 B2 | * | 2/2015 | Facchinello | B60J 7/141 296/100.06 |
| 9,004,571 B1 | * | 4/2015 | Bernardo | B60J 7/141 296/100.03 |
| 9,421,851 B2 | * | 8/2016 | Kerr, III | B60J 7/141 |
| 2005/0029832 A1 | * | 2/2005 | Verduci | B60J 7/19 296/100.06 |
| 2007/0210609 A1 | * | 9/2007 | Maimin | B60P 7/02 296/100.09 |

(Continued)

*Primary Examiner* — Pinel Romain
(74) *Attorney, Agent, or Firm* — Harness, Dickey & Pierce, P.L.C.

(57) ABSTRACT

A tonneau cover can be foldable between an extended configuration and a folded configuration. In the extended configuration, the primary panel plane of each of the plurality panels can all be substantially coplanar with each other and with a first plane. In the folded configuration, the plurality of panels can all be substantially aligned to form a stack of the plurality of panels, wherein the stack is disposed above the cargo box. The forward panel can be pivotable between a raised configuration corresponding to the folded configuration and a storage configuration. In the storage configuration, the primary plane of the forward panel can be in a second plane that is substantially orthogonal to the first plane to dispose the stack within the cargo box.

25 Claims, 9 Drawing Sheets

(56) References Cited

U.S. PATENT DOCUMENTS

| | | | |
|---|---|---|---|
| 2009/0236870 A1* | 9/2009 | Duncan | B60J 7/20 |
| | | | 296/136.04 |
| 2013/0229027 A1 | 9/2013 | Copp et al. | |
| 2015/0291017 A1* | 10/2015 | LaBiche | B60J 7/141 |
| | | | 296/100.09 |
| 2016/0114666 A1* | 4/2016 | Xu | B60J 7/141 |
| | | | 296/100.07 |

\* cited by examiner

SELF-STORING FOLDING TONNEAU COVER

FIELD

The present disclosure relates to tonneau covers and, more particularly, relates to folding tonneau covers that can be stored below in a vertical position within the cargo box area of a truck.

BACKGROUND

This section provides background information related to the present disclosure which is not necessarily prior art.

Trucks such as pickups and trucks having a cargo box can be a quite popular type of vehicle because the cargo box enables objects of various sizes to be placed therein and transported. The cargo box pickup generally has a floor surface or bed that is bounded by a forward wall, opposing side walls and a tailgate providing a rearward wall.

Covers can be used to enclose the cargo box to protect the contents against dirt, debris, and other environmental contaminants, and to improve the aesthetic quality thereof. In some cases, the covers can be formed of generally planar sections or panels hingedly coupled together so they can be folded together in a stacked configuration to allow access to the cargo box. The stacked panels typically still leave a portion of the cargo box covered. In some cases the stacked panels can be rotated so the tonneau cover extends upwardly above the truck box and rests against or generally adjacent the rear window of the passenger compartment of the pickup. Although this can reduce the portion of the cargo box affected by the stacked panels, this upwardly extending orientation can result in the tonneau cover partially or completely obscuring the view out the rear window.

Therefore, there exists a need to provide a foldable tonneau cover that is capable of providing sufficient protection to the bed and/or its contents. Moreover, there exists a need to provide a hard tonneau cover that is more easily configured into a stowed position so that the folded, stacked panels do not unnecessarily obscure sightlines through the rear window or access to the truck box.

SUMMARY

This section provides a general summary of the disclosure, and is not a comprehensive disclosure of its full scope or all of its features.

According to one aspect of the present disclosure, a tonneau cover system for a cargo box, including a forward end and opposing lateral sides extending from the forward end, is provided. The tonneau cover can include a plurality of panels hingedly coupled together. The plurality of panels can include a forward panel having a forward edge pivotally mountable to the cargo box adjacent the forward end thereof. Each of the plurality of panels can have a primary panel plane substantially aligned with an upper surface thereof. The tonneau cover can be foldable between an extended configuration and a folded configuration. In the extended configuration, the primary panel plane of each of the plurality panels can all be substantially coplanar with each other and with a first plane. In the folded configuration, the plurality of panels can all be substantially aligned to form a stack of the plurality of panels, wherein the primary plane of each of the plurality of panels are substantially parallel in the stack. In the folded configuration, the primary plane of the forward panel can remain substantially in the first plane to dispose the plurality of panels of the stack above the cargo box. The forward panel can be pivotable about an axis adjacent the forward edge between a raised configuration corresponding to the folded configuration and a storage configuration. In the storage configuration, the primary plane of the forward panel can be in a second plane that is substantially orthogonal to the first plane to dispose the primary plane of each of a remainder of the plurality of panels substantially parallel to the second plane and to dispose the stack within the cargo box.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
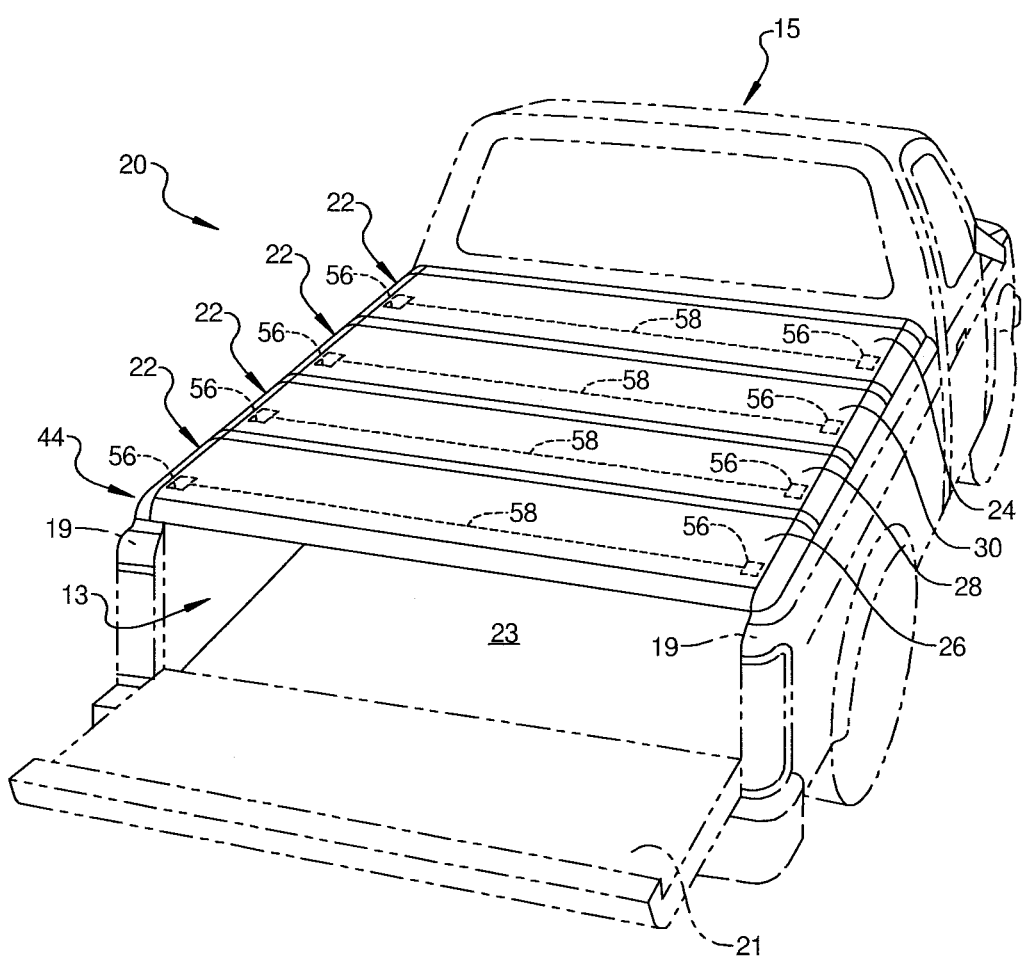
FIG. 1 is a perspective view illustrating a foldable tonneau cover in accordance with the present disclosure in an extended or unfolded configuration covering a cargo box of a pickup truck.
Figure 2:
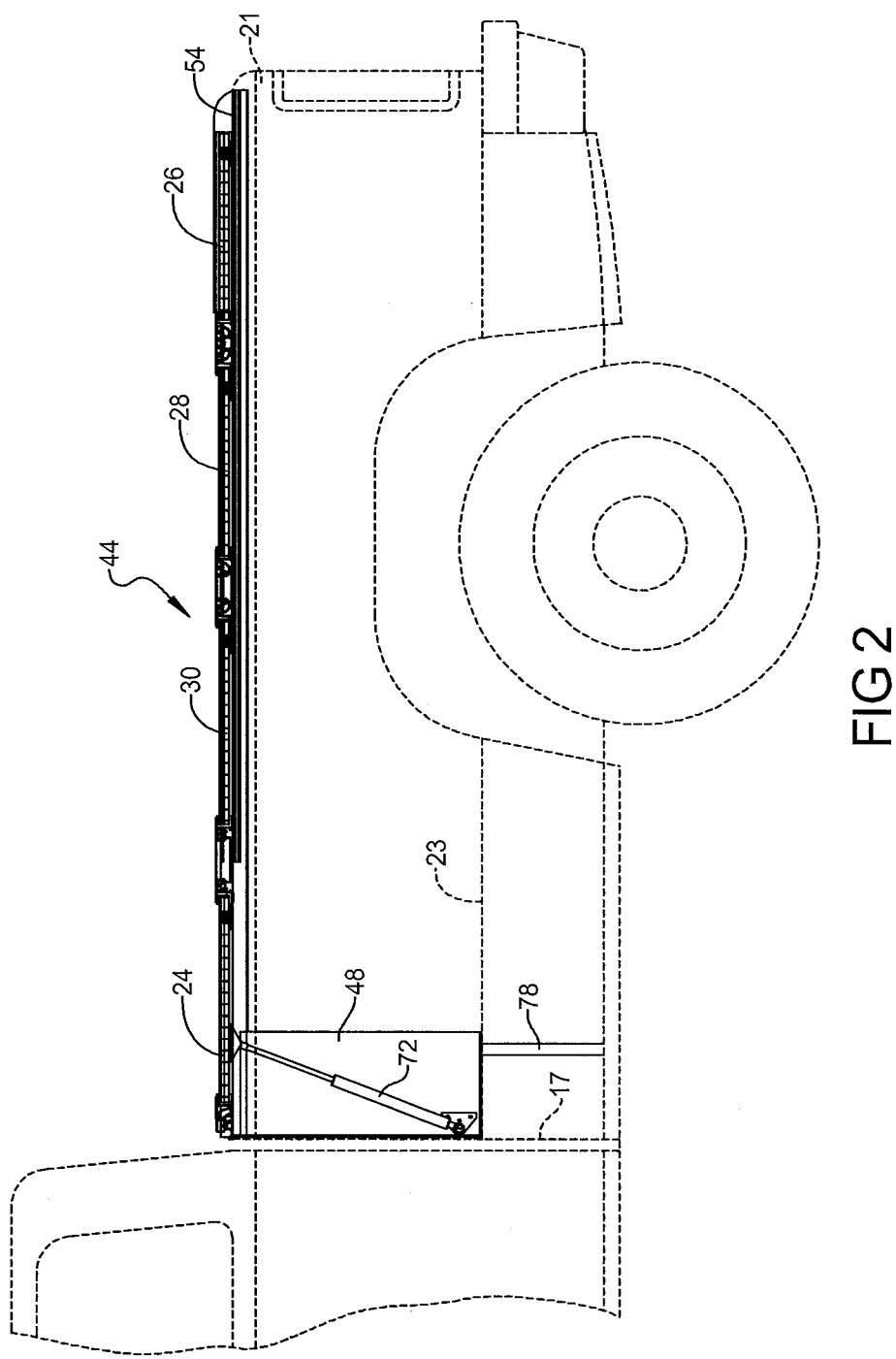
FIG. 2 is a cross-section view of the foldable tonneau cover for a truck bed of FIG. 1 in an extended or unfolded configuration covering a cargo box of a pickup truck.

Example embodiments will now be described more fully with reference to the accompanying drawings.

Referring to FIGS. 1-5, a tonneau cover system 20 for covering a truck bed or cargo box 13 is provided. In some cases, the truck bed or cargo box 13 can be part of a pickup truck 15 as shown. Briefly, cargo box 13 can comprise a plurality of sidewalls, namely a lateral or transverse front wall 17, a pair of opposing longitudinal sidewalls 19, and a lateral or transverse rear wall or tailgate 21. These walls can extend vertically from a generally planar bottom surface 23. Traditionally, walls 17, 19, 21 generally extend to a common height above bottom surface 23, to provide the cargo box with a substantially uniform depth.

Figure 5:
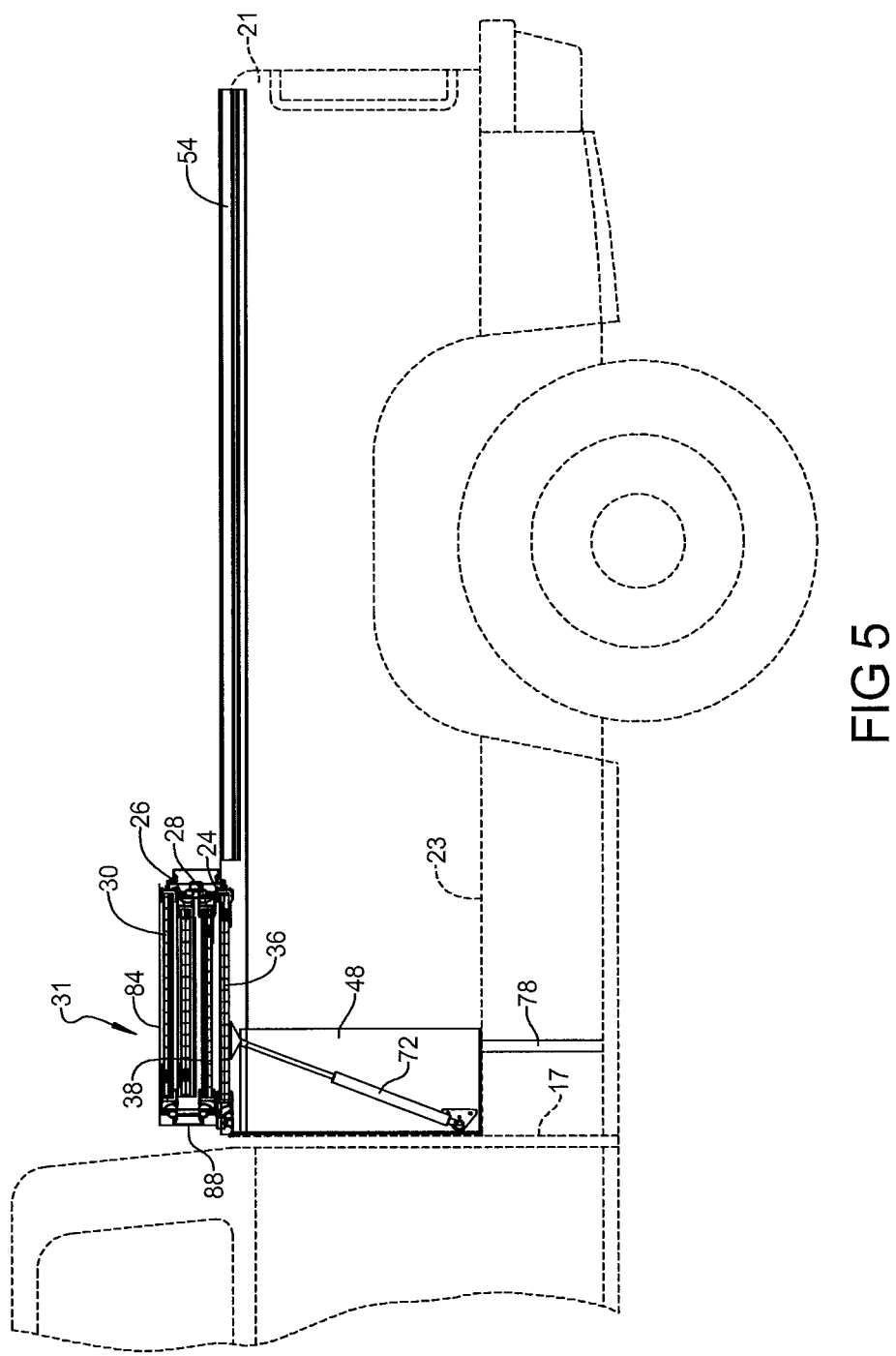
FIG. 5 is a cross-section view of the foldable tonneau cover for a truck bed of FIG. 2 showing the folded rearward, first and second panels of FIG. 4 folded onto the forward panel in a folded or raised configuration.
Figure 6:
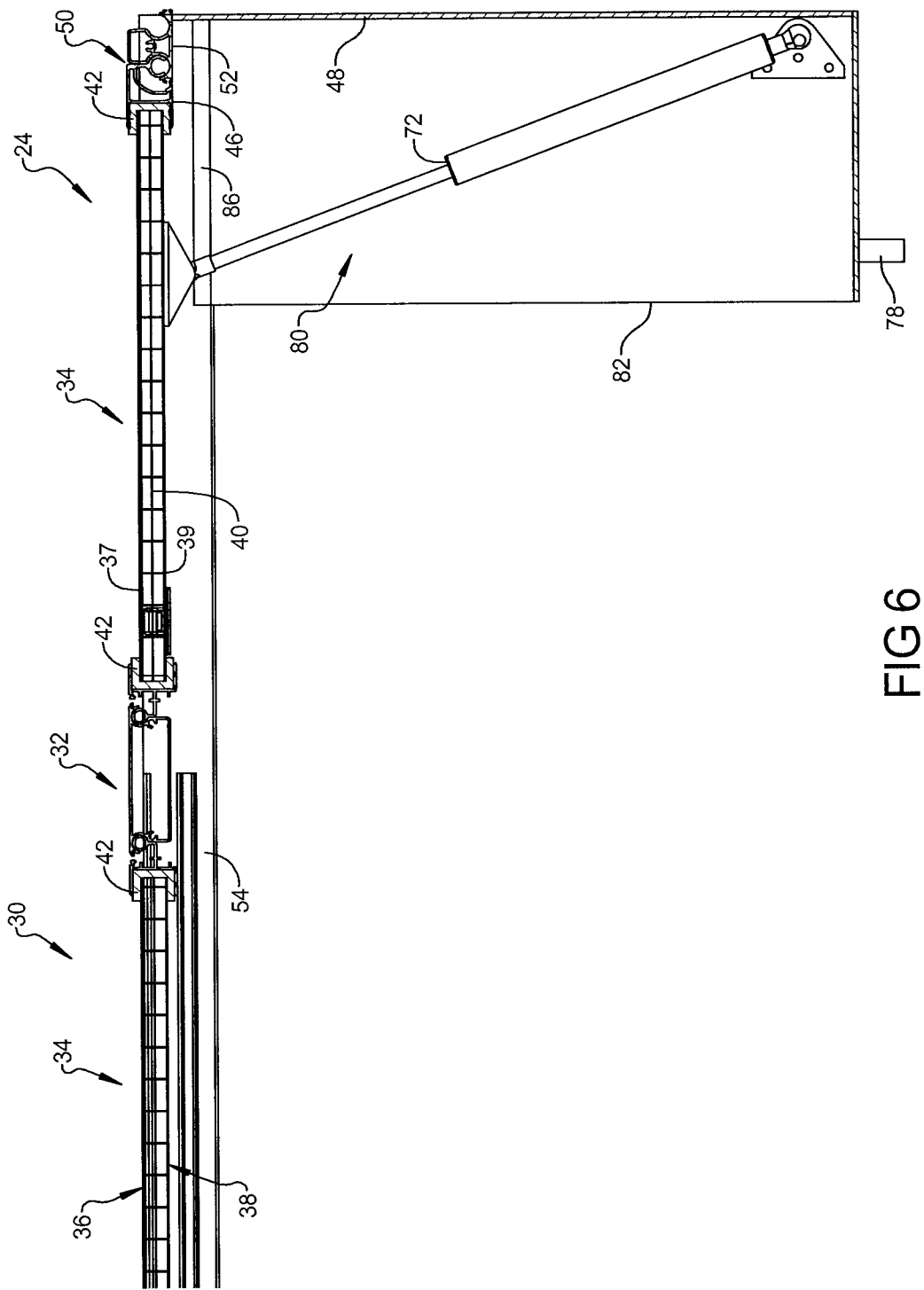
FIG. 6 is an enlarged partial cross-section view of a forward portion of the tonneau system of FIG. 2.
Figure 7:
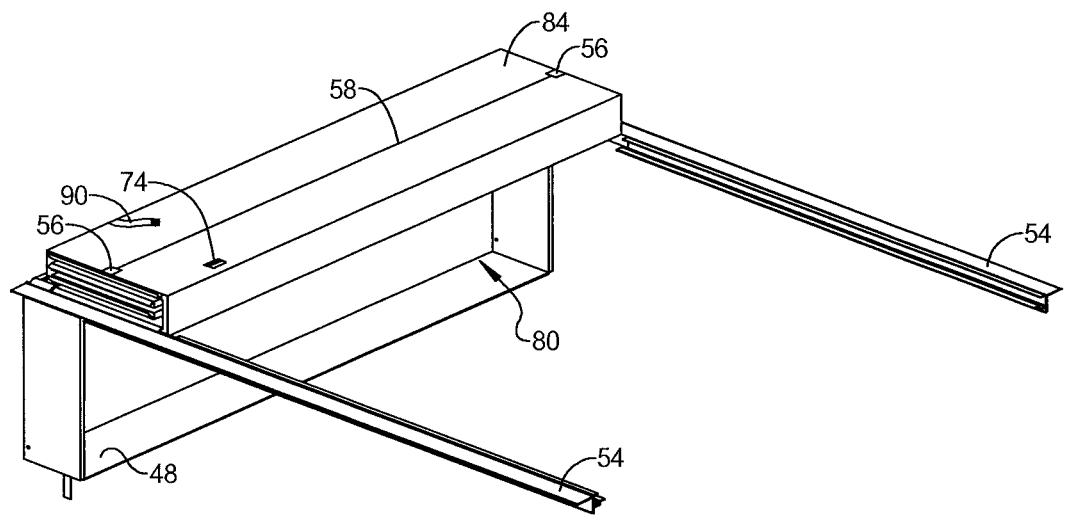
FIG. 7 is a perspective view of the tonneau system of FIG. 2 with the tonneau cover in the folded or raised configuration.

In some embodiments, the tonneau cover 44 of the tonneau cover system 20 can include a plurality of panels 22 including a forward panel 24. A remainder of the plurality of panels can include a rearward panel 26, a second panel 28, and a third panel 30. The plurality of panels 22 can be hingedly coupled together to be foldable between a deployed or extended configuration covering the cargo box 13 (FIGS. 1-2) and a folded or raised configuration wherein the panels 22 are stacked upon and overlie the forward panel 24 (FIG. 5). In some cases, the tonneau cover 44 can include at least four panels 22. In some embodiments, the plurality of panels 22 can be interlockingly coupled to adjacent panels 22 to provide a pivotable or hinged connection therebetween. For example, interlocking or cooperating aluminum extrusions 32 and/or frame members 42 between adjacent panels 22 can provide the pivotable or hinged connection therebetween.

In some embodiments, the panels 22 of the tonneau cover 44 can comprise a central rigid panel 34. In some instances, an upper or top face 36 and bottom face 38 of the rigid panels 34 can be provided by top and bottom outer sheet layers or skins, 37 and 39, respectively, which can be made of metal or plastic material, that sandwich a central core 40, which can comprise a rigid foam, honeycomb, or other structure. In some cases, the panels 22 of the tonneau cover 44 can comprise an outer frame structure formed by the frame members 42. In some embodiments, a flexible material can a span between the frame structure 42 in addition to, or as an alternative to, the central rigid panels 34. Each of the panels 22 can have a primary panel plane, which can be substantially parallel or aligned with an upper surface or face 36 of the panels 22.

When the tonneau cover 44 is in the deployed or extended configuration (FIGS. 1-2), the bottom face 38 of each panel section can be positioned to face toward the bottom surface 23 of the cargo box 13, with the top face 36 opposite the bottom face 38 and facing upwardly or away from the bottom surface 23. In this deployed or extended configuration, the primary panel plane of each of the plurality panels can all be substantially coplanar with each other and with a first plane, which first plane can be substantially horizontal in the orientation of FIG. 2.

Figure 3:
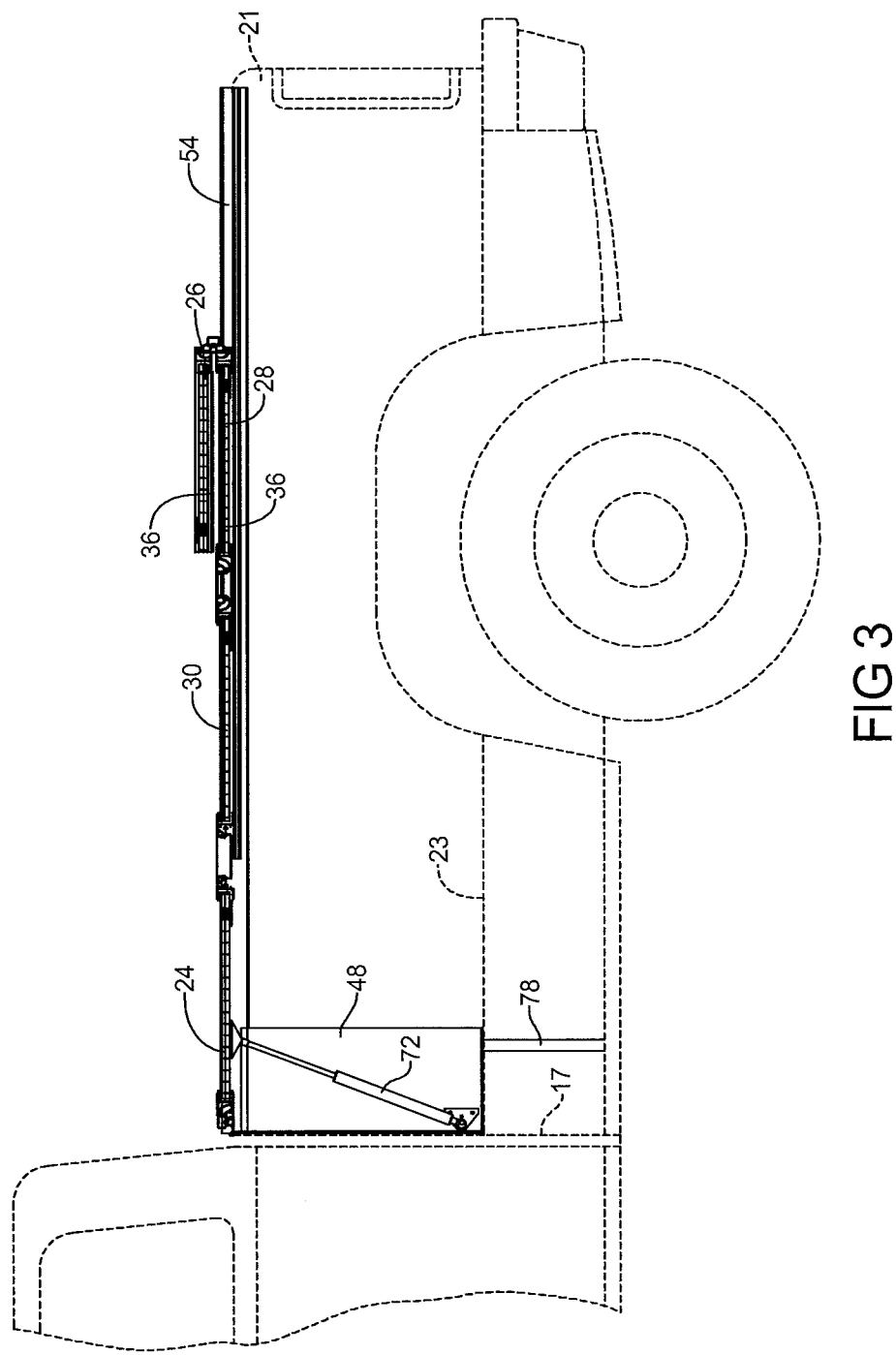
FIG. 3 is a cross-section view of the foldable tonneau cover for a truck bed of FIG. 2 showing the rearward panel folded onto a second panel in a first intermediate folded configuration.

In a first intermediate folded configuration of FIG. 3, the rearward panel 26 can be pivoted 180 degrees and folded so the top face 36 of the rearward panel 26 can be positioned to oppose or face toward the adjacent top face 36 of the second panel 28. In a second intermediate folded configuration of FIG. 4, the folded rearward and second panels 26 and 28, respectively, of FIG. 3 can be pivoted 180 degrees and folded onto a third panel 30 so the bottom face of the rearward panel 26 can be positioned to oppose or face toward the adjacent top face 36 of the third panel 30.

Figure 4:
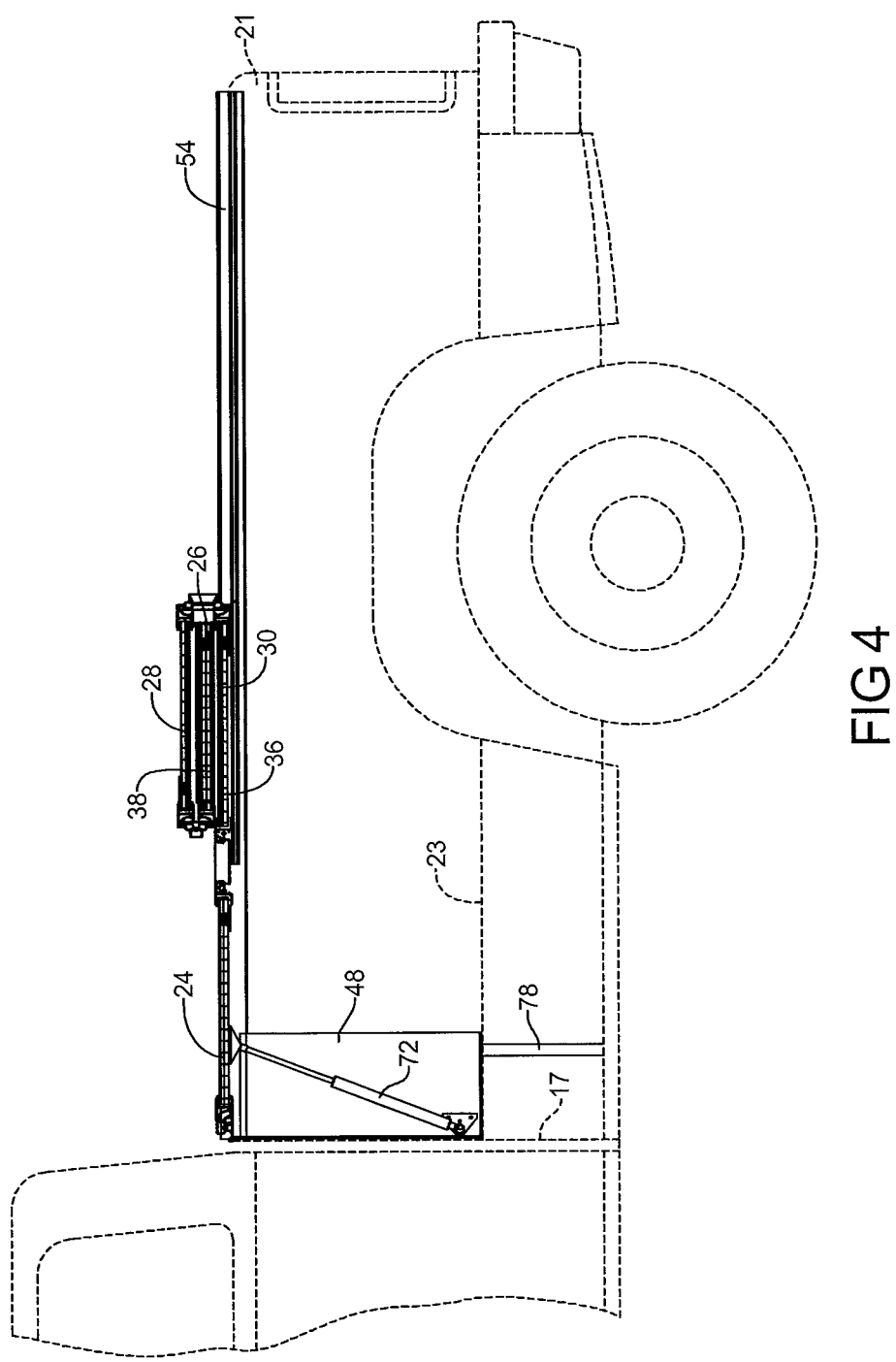
FIG. 4 is a cross-section view of the foldable tonneau cover for a truck bed of FIG. 2 showing the folded rearward and second panels of FIG. 3 folded onto a third panel in a second intermediate folded configuration.

In the folded or raised configuration of FIG. 5, the folded rearward, second, and third panels 26, 28, and 30, respectively, of FIG. 4 can be pivoted 180 degrees and folded onto the forward panel 24 so the bottom face 38 of the second panel 28 can be positioned to oppose or face toward the adjacent top face 36 of the forward panel 24. Thus, it should be apparent that the panels 22 can be hingedly folded in a spiral configuration. In this folded or raised configuration, the panels 26, 28, 30 can be substantially aligned or overlie the forward panel 24 and each other to form a stack 31 of the plurality of panels 22. In some instances, in the stack 31, the primary plane of each of the plurality of panels 22 can be substantially parallel with, and vertically spaced from, each other. In some cases, the primary plane of the forward panel 24 can remain substantially in the first plane in the folded or raised configuration to dispose at least panels 26, 28, 30 of the stack 31 above the cargo box 13.

Figure 8:
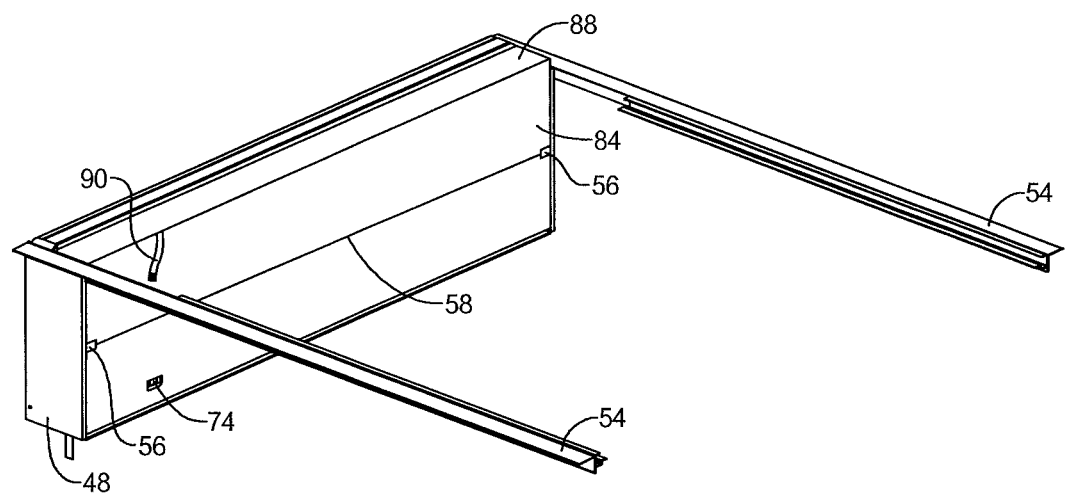
FIG. 8 is a perspective view of the tonneau system of FIG. 2 with the tonneau cover in a storage configuration.

Referring to FIGS. 5-8, the forward panel 24 can be directly or indirectly hingedly coupled to the cargo box 13 along a forward edge 46 of the forward panel 24. In some embodiments, interlocking or cooperating extrusions 50 and/or frame members 42 can be coupled along the forward edge 46 of the forward panel 24 and a storage holder or box 48 that is in turn coupled to the cargo box 13. In some cases, the forward panel 24 can be pivotally mountable to the cargo box 13 via a header 52 pivotally coupled along the forward edge 46 of the forward panel 24. In some cases, the forward edge 46 of the forward panel 24 can be directly hingedly coupled to the cargo box 13. The forward panel 24 can be pivotable about an axis extending along or parallel to the forward edge 46 between the raised configuration corresponding to the folded configuration (FIGS. 5 and 7) and a storage configuration (FIG. 8). In some cases the pivot angle of the forward panel 24 between the raised and storage configuration can be substantially 90 degrees.

In the storage configuration, the primary plane of the forward panel 24 can be in a second plane that is substantially orthogonal to the first plane and the primary plane of each a remainder of the plurality of panels 26, 28, and 30 of the plurality of panels 22 can be substantially parallel to the second plane. In the storage configuration, the stack 31 can be disposed within the cargo box 13 or substantially below a top edge of the walls 17, 19, and 21. In some cases, the width between the forward and rearward edges of each panel 22, including the widest of the plurality of panels 22, is less than a depth of the cargo box 13.

Referring to FIGS. 7-11, in some embodiments, the tonneau cover system 20 can include a pair of opposing side rails 54. Each of the side rails 54 can be coupled to respective longitudinal opposing side walls 19 of the cargo box 13 via clamps, fasteners, or other suitable mechanisms (not shown). In some cases, the opposing side rails 54 can be coupled to the opposing side walls 19 at or about an upper surface 25 or at or above the top portion of the opposing side walls 19 or of the cargo box 13. In some embodiments, the first plane, with which the primary planes of the panels 22 are coplanar in the extended configuration, can be positioned to extend at or above the side rails 54, and can extend parallel to the longitudinal length the side rails 54.

In some embodiments, the plurality of panels 22 can include one or more panel latches 56. In some cases, a pair of panel latches 56, with one adjacent each opposite lateral side, can be provided. In some cases, a latch operating mechanism 58, such as a cable or rod, can be coupled between the pair of latches 56 of a panel 22 to enable simultaneous, one-handed operation of the pair of latches 56 of a panel 22. When engaged with the side rail 54, the pair of latches 56 of a panel can prevent opening or folding of the panel 22 from the extended configuration or toward the folded configuration. When the pair of latches 56 of a panel 22 is disengaged (e.g., moved inwardly in the example embodiment), the panel 22 can be folded from the extended configuration or toward the folded configuration.

Figure 9:
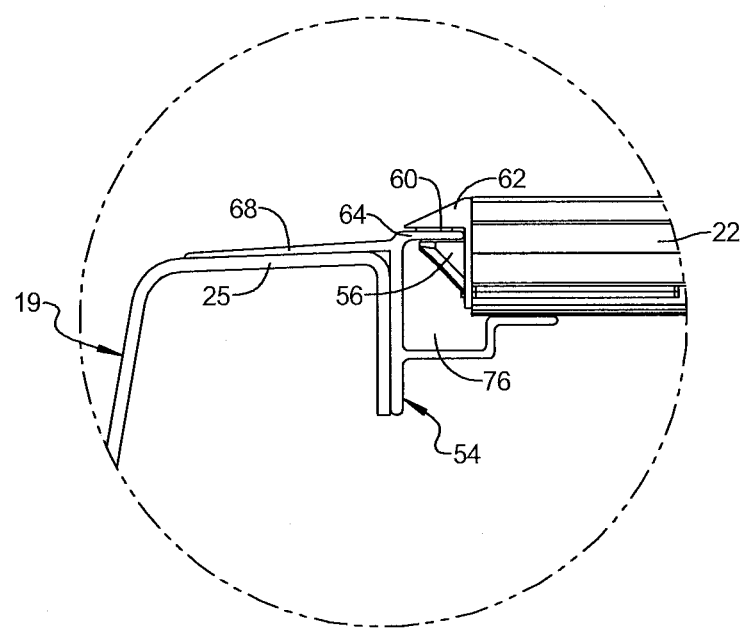
FIG. 9 is an enlarged partial cross-section view of a longitudinal side portion of the tonneau cover system of FIG. 2 at a rearward panel thereof.
Figure 10:
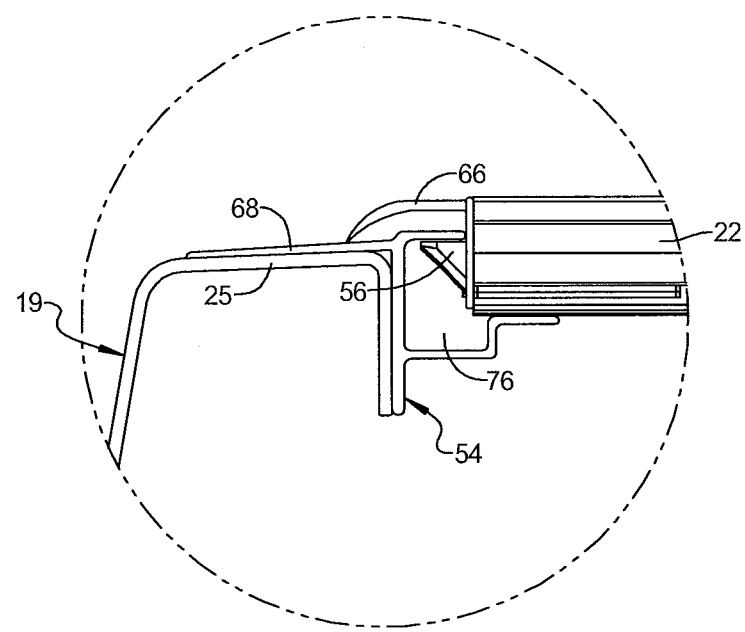
FIG. 10 is an enlarged partial cross-section view of an alternative longitudinal side portion of a tonneau cover system at a rearward panel thereof.

In some embodiments, a seal member can be provided along each opposite lateral side of the panels 22. In some cases, as illustrated in FIG. 9, a rigid side cap or side frame member 62 can extend along each opposite lateral side of the panels 22 and can carry a flat seal member 60 on a lower surface thereof. In the extended configuration, the side frame member 62 can position the seal member 60 against an upper surface of an upper flange member 64 of the side rail 54. In some cases, as illustrated in FIG. 10, a flexible seal member 66 can be coupled along the sides or along a top periphery of the panels 22 to extend laterally and seal against the adjacent side rail 54, such as upper flange member 64 or outer flange member 68 adjacent upper surface 25 of adjacent opposing side wall 19, or directly against the adjacent side wall 19. In some cases, (not shown) dual flexible seal members can extend toward each other from both the side rail 54 and the adjacent panel 22 so the dual flexible seal members seal with each other between the side rail 54 and the adjacent panel 22. Of course, other seal options are possible.

Figure 11:
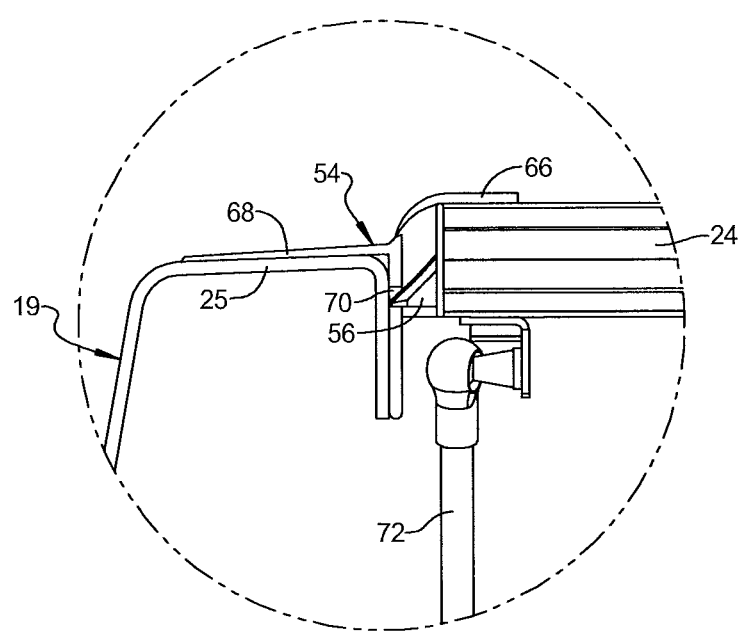
FIG. 11 is an enlarged partial cross-section view of a longitudinal side portion of the tonneau cover system of FIG. 2 at the forward panel thereof.

In some embodiments, as illustrated in FIG. 11, the cross-section of the side rail 54 can be different adjacent the forward panel 24. In some cases, the different cross sections can be different parts of a one-piece side rail 54, or can be different pieces of a side rail 54 and/or bracket member. Although other seal options are possible as discussed above, in some cases, a flexible seal member 66 similar to that of FIG. 10 can be provided along opposite lateral sides of the forward panel 24 to seal against the side rail 54. In some embodiments, a length extending between the opposite lateral sides of the forward panel 24 can be larger than the length of the remaining panels 26, 28, and 30.

In some embodiments, the forward panel 24 can include one or more forward panel latches 56. In some cases, a pair of forward panel latches 56 can be provided on the forward panel 24, one of the pair along each opposite lateral side with a latch operating mechanism 58 coupled between the pair similar to the remainder of the panels. The forward panel latch or latches 56, however, can in some cases be reversed and can engage an aperture 70 in the adjacent side rail or bracket member 54. When engaged with the side rail 54, the pair of latches 56 of the forward panel 24 can retain the forward panel 24 in the raised configuration when engaged, and can provide support for the panels 26, 28, 30 stacked on the forward panel 24 in the folded configuration. When the pair of latches of the forward panel 24 is disengaged (e.g., moved inwardly in the example embodiment), the forward panel 24 carrying the stack 31 of the remaining panels 26, 28, 30 can be rotated downwardly into the cargo box 13, and into the storage holder 48, and into the storage configuration.

In some embodiments, in addition to or as an alternative to the forward panel latches 56, a gas assist piston and cylinder mechanism 72 can be coupled between the tonneau cover 44 and the cargo box 13, directly or indirectly. For example, such a piston and cylinder mechanism 72 can be indirectly coupled to the cargo box 13 via the storage holder 48 of the tonneau cover system 20. In some cases, the piston and cylinder mechanism 72 can resist sufficient force or require an actuation force such that the piston and cylinder mechanism 72 can support the stack 31 of panels 22 in the raised or folded configuration without need of any other device. In some cases the piston and cylinder mechanism 72 can at least facilitate pivoting movement of the stack 31 of the plurality of panels 22 between the raised configuration and the storage configuration.

In some embodiments a grasping member 74, such as a handle, strap, etc., can be coupled to the tonneau cover 44 to facilitate a user pivoting the stack 31 of the plurality of panels 22 between the raised configuration (FIG. 7) and the storage configuration (FIG. 8). In some embodiments, the side rails 54 can include a water management channel 76 to capture any water that may make it past the seal members 60, 66. Similarly, the storage holder or box 48 can capture such water and can include a drainage tube 78 to route such water out of the storage box 48 and out of the cargo box 13.

In some embodiments, a storage holder or box 48 can be positionable within the cargo box 13 and coupleable thereto. The storage holder 48 can be sized and shaped to receive the stack 31 of the plurality of panels 22 within the storage holder 48 in the storage configuration. The storage holder can be a partial or complete box 48 having one or more sides. For example, the box may not have a front side, a bottom side, etc., or combinations thereof. In some embodiments, a storage box 48 can include at least one opening 80 through which the stack 31 of panels 22 passes while moving between the raised configuration and the storage configuration. The opening 80 can include a side opening 82. In some embodiments, a side panel 84 can be coupled to the tonneau cover 44, such as to a bottom of the panel 30 adjacent the forward panel 24. This side panel 84 can be sized and shaped to close the side opening 82 of the storage box 48 when in the storage configuration. In some cases, the opening 80 can include a top opening 86 and a top panel 88 can be coupled to the tonneau cover 44, such as to a hinge member between the panels 22. The top panel 88 can be sized and shaped to close the top opening 86 of the storage box 48 when in the storage configuration. In some embodiments, the side panel 84 and the top panel 88 can be hingedly coupled together.

In some embodiments, a retention member 90, such as a strap, clamp, latch, etc., can be coupled to the tonneau cover 44 to couple the plurality of panels 22 together in the stack 31 to retain the plurality of panels 22 in the stack 31 as the stack 31 pivots or moves between the raised configuration and the storage configuration. Thus, a user can engage the retention member 90 when the tonneau cover 44 is in the raised configuration prior to proceeding to pivot the stack 31 into the storage configuration. Similarly, a user can disengage the retention member 90 when the tonneau cover 44 is in the raised or folded configuration prior to proceeding to unfold the panels 22 toward the extended configuration.

In some embodiments, one or more storage latches 56 can be coupled to the tonneau cover 44 to retain the stack 31 of the plurality of panels 22 within the storage holder 48 in the storage configuration. In some cases, a pair of latches 56 can be coupled to opposite lateral sides of the tonneau cover 44. In some cases, an actuation mechanism 58 can be coupled between each latch 56 to permit one-handed, simultaneous actuation of both latches 56. In some cases, the storage latch or latches 56 can be the same latch or latches 56 as one or more of the panel latches 56, such as those of the forward panel 24. In some cases, the storage latches 56 can engage aperture or flanges of the storage box 48.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for a cargo box of a truck, the cargo box having a forward end and opposing lateral sides extending from the forward end, the tonneau cover system comprising:
   a tonneau cover including a plurality of panels hingedly coupled together, the plurality of panels comprising a forward panel mountable adjacent the forward end of the cargo box, each panel having an upper surface;
   the tonneau cover being foldable between an extended configuration in which the upper surfaces of the plurality panels are in a first plane to overlie the cargo box and a folded configuration in which the plurality of panels are arranged in a stack;
   wherein the stack is pivotable about an axis adjacent a forward edge of the forward panel between a raised configuration wherein the panels are arranged in the stack overlying the forward panel and the stack extends above the cargo box and a storage configuration in which the stack is received inside the cargo box and the upper surface of the forward panel is substantially orthogonal to the first plane.

2. The tonneau cover system of claim 1, wherein the upper surfaces of each panel of the plurality of panels are parallel in the stack.

3. The tonneau cover system of claim 2 wherein the upper surfaces of each panel of the plurality of panels are substantially orthogonal to the first plane in the storage configuration.

4. The tonneau cover system of claim 1, wherein the panels have a spiral fold configuration in the stack in which the upper surfaces of an adjacent pair of the plurality of panels in the stack are positioned in face-to-face relationship.

5. The tonneau cover system of claim 1, wherein the forward panel has a rear edge opposite the forward edge, the rear edge being hingedly coupled to a remainder of panels and the rear edge being located within the cargo box below the forward edge in the storage configuration.

6. The tonneau cover system of claim 1, further comprising a pair of side rails mountable to the cargo box for supporting the tonneau cover in the extended configuration, and wherein the first plane is positioned at or above the side rails.

7. The tonneau cover system of claim 6, further comprising a latch between at least one of the side rails and the tonneau cover to support the stack in the raised configuration, and the latch being disengageable from the side rail to permit the stack to pivot between the raised configuration and the storage configuration.

8. The tonneau cover system of claim 6, further comprising a pair of latches, each latch positioned adjacent opposite sides of the forward panel and coupleable between the forward panel and the side rails, respectively, to retainably couple the forward panel to the side rails in the raised configuration, and the pair of latches being disengageable from the side rails to permit the stack to pivot between the raised configuration and the storage configuration.

9. The tonneau cover system of claim 8, further comprising an actuation mechanism connected to the pair of latches to simultaneously actuate the pair of latches.

10. The tonneau cover system of claim 1, wherein the cargo box has depth, and each panel of the plurality of panels have width between forward and rear edges that is less than the depth.

11. The tonneau cover system of claim 1, further comprising a retention member for coupling the plurality of panels together in the stack to retain the plurality of panels in the stack as the stack moves between the raised configuration and the storage configuration.

12. The tonneau cover system of claim 1, further comprising a gas assist mechanism coupled to the tonneau cover to facilitate pivoting movement of the stack of the plurality of panels between the raised configuration and the storage configuration.

13. The tonneau cover system of claim 1, further comprising a storage holder positionable within the cargo box and sized and shaped to hold the stack in the storage configuration.

14. The tonneau cover system of claim 13, further comprising a latch coupleable between the stack and the storage holder to retainably couple the stack to the storage holder in the storage configuration.

15. The tonneau cover system of claim 13, further comprising a pair of latches, each latch positioned adjacent opposite sides of the stack and coupleable between the stack and the storage holder to retainably couple the stack to the storage holder in the storage configuration, and an actuation mechanism is connected to the latches to simultaneously actuate the latches.

16. The tonneau cover system of claim 13, wherein the storage holder comprises at least a partial box shape that includes a side opening through which the stack passes while moving between the raised configuration and the storage configuration.

17. The tonneau cover system of claim 13, wherein the storage holder comprises at least a partial box shape that includes a top opening through which the stack passes while moving between the raised configuration and the storage configuration, and the tonneau cover includes a top panel that is sized and shaped to close the top opening of the storage holder in the storage configuration.

18. The tonneau cover system of claim 1, further comprising a grasping member coupled to the tonneau cover to facilitate pivoting movement of the stack of the plurality of panels between the raised configuration and the storage configuration.

19. The tonneau cover system of claim 1, wherein the forward panel is pivotally mountable to the cargo box via a header pivotally coupled to the forward edge of the forward panel.

20. A tonneau cover system for a cargo box of a truck, the cargo box having a forward end and opposing lateral sides extending from the forward end, the tonneau cover system comprising:
a tonneau cover including a plurality of panels hingedly coupled together, the plurality of panels comprising a forward panel mountable adjacent the forward end of the cargo box;
the tonneau cover being foldable between an extended configuration in which the upper surfaces of the plurality panels are in a first plane to overlie the cargo box and a folded configuration in which the plurality of panels are arranged in a stack;
the stack being pivotable about an axis adjacent a forward edge of the forward panel between a raised configuration wherein the panels are arranged in the stack overlying the forward panel and the stack extends above the cargo box and a storage configuration in which the stack is received inside the cargo box and the upper surface of the forward panel is substantially orthogonal to the first plane;
a latch engageable to support the stack relative to the truck box in the raised configuration and disengageable to allow the stack to move between the raised configuration and the storage configuration.

21. The tonneau cover system of claim 20, further comprising a pair of side rails mountable to the cargo box for supporting the tonneau cover in the extended configuration, wherein the latch comprises a pair of latches, each of the latches engageable between the tonneau cover and a respective one of the side rails.

22. The tonneau cover system of claim 21, wherein the pair of latches are mounted on the tonneau cover and each latch is positioned to directly engage the respective one of the side rails.

23. The tonneau cover system of claim 20, further comprising a storage holder positionable within the cargo box and sized and shaped to hold the stack in the storage configuration.

24. The tonneau cover system of claim 23, wherein the storage holder comprises at least a partial box shape.

25. The tonneau cover system of claim 20, further comprising a pair of side rails mountable to the cargo box for supporting the tonneau cover in the extended configuration, wherein the latch comprises a pair of latches, each of the latches engageable between the tonneau cover and a respective one of the side rails, and further comprising a storage holder positionable within the cargo box and sized and shaped to hold the stack in the storage configuration.

* * * * *